US009759256B2

(12) United States Patent
Brewster et al.

(10) Patent No.: US 9,759,256 B2
(45) Date of Patent: Sep. 12, 2017

(54) VACUUM PUMP

(71) Applicant: Edward Limited, Crawley, West Sussex (GB)

(72) Inventors: Barrie Dudley Brewster, Brighton (GB); Martin Ernst Tollner, Eastbourne (GB); Paul David Flower, Abingdon (GB)

(73) Assignee: Edwards Limited, Burgess Hill, West Sussex (GB)

( * ) Notice: Subject to any disclaimer, the term of this patent is extended or adjusted under 35 U.S.C. 154(b) by 322 days.

(21) Appl. No.: 14/477,154

(22) Filed: Sep. 4, 2014

(65) Prior Publication Data

US 2014/0369831 A1    Dec. 18, 2014

Related U.S. Application Data

(62) Division of application No. 12/522,317, filed as application No. PCT/GB2008/050022 on Jan. 9, 2008, now Pat. No. 8,851,829.

(30) Foreign Application Priority Data

Jan. 29, 2007 (GB) .................................. 0701609.0

(51) Int. Cl.
*F04D 19/04* (2006.01)
*F16C 27/04* (2006.01)
(Continued)

(52) U.S. Cl.
CPC ............ *F16C 27/04* (2013.01); *F04D 19/042* (2013.01); *F04D 29/049* (2013.01);
(Continued)

(58) Field of Classification Search
CPC ...... F16C 27/04; F16C 19/163; F04D 19/042; F04D 29/0462; F04D 29/049; F04D 29/059; F04D 29/601; F04D 29/668
See application file for complete search history.

(56) References Cited

U.S. PATENT DOCUMENTS 2,487,343 A   11/1949 Kopf
3,639,014 A   2/1972 Sixsmith
(Continued)

FOREIGN PATENT DOCUMENTS

CH          658499 A5    11/1986
DE         1425987 A1    4/1969
(Continued)

OTHER PUBLICATIONS

Prosecution history of corresponding U.S. Appl. No. 12/522,317 which claims priority of PCT Application No. PCT/GB2008/050022 including: Notice of Allowance dated Jun. 5, 2014; Response dated May 29, 2014; Office Action dated Jan. 29, 2014; Amendment with RCE dated Dec. 23, 2013; Final Office Action dated Oct. 7, 2013; Amendment dated Sep. 6, 2013; Office Action dated Mar. 6, 2013 and Preliminary Amendment dated Jul. 7, 2009.
(Continued)

*Primary Examiner* — Richard Edgar
(74) *Attorney, Agent, or Firm* — Westman, Champlin & Koehler, P.A.; Theodore M. Magee

(57) ABSTRACT

A pump insert (50) for supporting a rotor (14) of a pump comprises an annular resilient support (52) for engaging the body (26) of the pump, the support (52) extending about a rolling bearing (10) having an inner race (12) for engaging the rotor (14), an axially preloaded outer race (16) fixed to the support (52), and a plurality of rolling elements (18) located between the races. During assembly, the rolling bearing (10) can be accurately positioned within the support (52) so that there is a very low tolerance stack-up when the
(Continued)

insert (50) is fitted to the rotor (14). Consequently, the position of the rotor (14) will hardly change, if at all, when the rolling bearing (10) is replaced during servicing of the pump.

9 Claims, 3 Drawing Sheets

(51) Int. Cl.
*F04D 29/059* (2006.01)
*F04D 29/66* (2006.01)
*F16C 19/16* (2006.01)
*F04D 29/046* (2006.01)
*F04D 29/049* (2006.01)
*F04D 29/60* (2006.01)
*F16C 19/06* (2006.01)

(52) U.S. Cl.
CPC ....... *F04D 29/0462* (2013.01); *F04D 29/059* (2013.01); *F04D 29/601* (2013.01); *F04D 29/668* (2013.01); *F16C 19/163* (2013.01); *F16C 19/06* (2013.01); *F16C 2360/45* (2013.01); *Y10T 29/49245* (2015.01)

(56) References Cited

U.S. PATENT DOCUMENTS

| | | | |
|---|---|---|---|
| 3,759,626 A | 9/1973 | Becker | |
| 3,969,042 A | 7/1976 | Bachler | |
| 4,872,767 A * | 10/1989 | Knapp | F01D 25/164 384/535 |
| 5,895,202 A | 4/1999 | Dauvillier | |
| 6,149,382 A | 11/2000 | Englander et al. | |
| 6,515,288 B1 | 2/2003 | Ryding et al. | |
| 7,553,123 B2 | 6/2009 | Casaro | |
| 7,828,512 B2 * | 11/2010 | Eilers | F04D 19/042 415/104 |
| 2001/0010438 A1 | 8/2001 | Bouille et al. | |
| 2005/0240282 A1 | 10/2005 | Rush et al. | |
| 2005/0241164 A1 | 11/2005 | Glantz | |
| 2006/0018774 A1* | 1/2006 | Casaro | F01D 25/164 417/423.12 |

FOREIGN PATENT DOCUMENTS

| | | | |
|---|---|---|---|
| DE | 2052120 A1 | 4/1972 | |
| DE | 3148191 A1 | 6/1983 | |
| DE | 3609618 A1 | 10/1986 | |
| DE | 19613471 A1 | 10/1997 | |
| DE | 19834111 A1 | 2/2000 | |
| DE | 60116987 T2 | 9/2006 | |
| EP | 0220581 A1 | 5/1987 | |
| EP | 1083349 A1 | 3/2001 | |
| EP | 1096124 A2 | 5/2001 | |
| EP | 1619400 A1 | 1/2006 | |
| GB | 1331166 | 9/1973 | |
| GB | 1397172 | 6/1975 | |
| GB | 2173867 A | 10/1986 | |
| GB | 2415019 A * | 12/2005 | ............. F16C 19/52 |
| JP | S60149524 | 10/1985 | |
| JP | 06033938 A | 2/1994 | |
| JP | 2001132480 A | 5/2001 | |
| JP | 2008002650 A * | 1/2008 | |
| WO | 2006001243 A1 | 1/2006 | |
| WO | 2006117515 A1 | 11/2006 | |
| WO | 2006131694 A1 | 12/2006 | |
| WO | 2008093134 A1 | 8/2008 | |

OTHER PUBLICATIONS

Bestatigung der Technische Informationsbibliothek und Universitatsbibliothek Hannover TIB/UB vom 26, 2010, betreffend die E6 [Confirmation of German National Library of Science and Technology/University Library Hannover (TIB/UB), 2010.
Becker et al., Federal Ministry of Research and Technology (BMFT): Forschungsbericht T 75-33: Technologische Forschung und Entwicklung, Weiterentwicklung von Turbo-Molekularpumpen [Research Report: Technological Research and Development, Further Development of Turbo-Molecular Pumps], Vakuumtechnik GmbH, 1975.
Office Action dated May 15, 2013 from corresponding Canadian Application No. 2,675,682.
First Office Action dated Aug. 4, 2012; Second Office Action dated Mar. 30, 2011; Third Office Action dated Dec. 23, 2011; Fourth Office Action dated Oct. 31, 2012; Fifth Office Action dated Mar. 5, 2013 and Sixth Office Action dated Sep. 4, 2013 from corresponding Chinese Application No. 200880003236.3.
Response dated Oct. 16, 2013 from corresponding European Application No. 08702105.1.
Notification of Reason for Rejection dated Oct. 10, 2012 and Notification of Reason for Rejection dated Oct. 25, 2013 from corresponding Japanese Application No. 2009-546816.
Office Action dated May 28, 2013 and Search Report dated May 17, 2013 from corresponding Taiwanese Application No. 097102531.
U.K. Search Report dated May 16, 2007 from corresponding British Application No. GB0701609.0.
PCT International Search Report dated Apr. 4, 2008 from corresponding PCT Application No. PCT/GB2008/050022.
PCT International Written Opinion dated Apr. 4, 2008 from corresponding PCT Application No. PCT/GB2008/050022.
Opposition No. 08702105.1/EP 2126365: *Edwards Limited* v. *Pfeiffer Vacuum GmbH* dated Feb. 27, 2013.
Taiwanese Office Action dated Mar. 3, 2015 for corresponding Taiwanese Application No. 097102531.
Office Action dated Jan. 27, 2017 for corresponding Indian Application No. 4477/CHENP/2009.

\* cited by examiner

VACUUM PUMP

CROSS-REFERENCE TO RELATED APPLICATION

The present application is a divisional of and claims priority of U.S. patent application Ser. No. 12/522,317, filed Jan. 28, 2010, which is a Section 371 National Stage Application of International Application No. PCT/GB2008/050022, filed Jan. 1, 2008, which is incorporated by reference in its entirety and published as WO 2008/093134 A1 on Aug. 7, 2008 and which claims priority of British Application No. 0701609.0, filed Jan. 29, 2007.

FIELD OF THE INVENTION

The invention relates to an insert for a pump, to a vacuum pump including such an insert, and to a method of assembling a pump insert.

BACKGROUND

Vacuum pumps typically comprise a body and a rotor supported for rotation relative to the body to draw gas from a tool connected to the inlet of the pump. The rotor is supported by a bearing arrangement comprising two bearings located at or intermediate respective ends of the rotor. Usually, the upper bearing is in the form of a magnetic bearing, and the lower bearing is in the form of a rolling bearing.

As illustrated in FIG. 1, a typical rolling bearing 10 comprises an inner race 12 extending about the rotor 14, an outer race 16, and a plurality of rolling elements 18, supported by a cage 20, for allowing relative rotation of the inner race 12 and the outer race 16. The rolling bearing 10 is lubricated to establish a load-carrying film separating the bearing components in rolling and sliding contact in order to minimize friction and wear, and shield elements 22 are provided to resist seepage of lubricant from the rolling bearing 10. A radial damping ring 24 is positioned radially between a radial end surface of the outer race 16 and the body 26 of the pump for damping radial movement of the outer race 16. An axial damping ring 28 is provided between an axial end surface of the outer race 16 and the body 26 for damping axial movement of the outer race 16. The rolling bearing 10 is secured to the rotor 14 by a threaded nut 30 which is screwed on to the end of the rotor 14 so that the upper (as illustrated) axial end surface 32 of the inner race 12 engages an abutment surface 34 of the rotor 14.

The upper magnetic bearing (not shown) typically comprises a stack of magnetic bearing rotor rings mounted on the rotor 14, and a stack of magnetic bearing stator rings, concentric with and located inside the rotor rings, mounted on an axially adjustable mounting which is accessed through the inlet of the pump. The axial position of the mounting is adjusted so that the stacks of rings are axially offset. Due to the forces of repulsion between the rings, the rotor 14 is biased in the axial direction so that an axial preload is applied to the rotor 14.

The rolling bearing 10 and the damping rings 24, 28 are usually replaced when the pump is serviced. As there is a tolerance stack-up between the upper (as illustrated) axial end surface of the inner race 12 of the bearing and the upper axial end surface 36 of the axial damping ring 28, this can result in the rotor 14 being in a different axial position following the replacement of these components. A change in this position of the rotor 14 will change the axial preload applied to the rotor 14 by the magnetic bearing; if this preload is too high the rolling bearing 10 may be subject to excessive wear, whilst if this preload is too low components of the rotor 14 may clash with components of the pump body 26 during use of the pump. Consequently, once the rolling bearing 10 has been replaced, the pump has to be disconnected from the tool so that the mounting for the magnetic bearing stator rings can be adjusted to ensure that the axial preload is at the required value. This can considerably increase the time required to service the pump.

SUMMARY

The present invention provides a vacuum pump comprising a body and a rotor supported for rotation relative to the body by an insert inserted around the rotor, the insert comprising a metallic, annular resilient support comprising inner and outer annular portions connected by a plurality of flexible members, the resilient support extending about a rolling bearing having an inner race, an axially preloaded outer race fixed to the inner annular portion of the resilient support, and a plurality of rolling elements located between the races.

During assembly, the rolling bearing can be accurately positioned within the support so that there is a very low tolerance stack-up when the insert is fitted to the rotor. Consequently, a set of inserts can be assembled with the rolling bearing being located in the same position relative to the support throughout the set of inserts. As a result, the position of the rotor will not change when the rolling bearing is replaced during servicing of the pump, and so there is no change in the axial preload of the rotor, and so no requirement to disconnect the pump from a tool during servicing. By axially preloading the outer race of the bearing, any internal clearance in the bearing is removed, thereby eliminating radial and axial play, and increasing system rigidity.

The invention extends to the insert per se, and therefore also provides an insert for insertion around a rotor of a pump, the insert comprising a metallic, annular resilient support comprising inner and outer annular portions connected by a plurality of flexible members, the resilient support extending about a rolling bearing having an inner race, an axially preloaded outer race fixed to the inner annular portion of the resilient support, and a plurality of rolling elements located between the races.

An axial end surface of the inner race is preferably axially displaced relative to an axial end surface of the resilient support. The end surface of the inner race is preferably axially displaced relative to the end surface of the resilient support by a distance in the range from 1 to 3 mm, and in the preferred embodiment is axially displaced by 1.8 mm.

The outer surface of the outer race is preferably attached to an inner surface of the inner annular portion of the support.

Each of the flexible members is preferably an elongate, arcuate member substantially concentric with the inner and outer annular portions. In the preferred embodiment, these members are circumferentially aligned. The flexible members of the resilient support can thus provide integral leaf springs of the resilient support, and hence determine the radial stiffness of the resilient support. The radial flexibility of the resilient support may be readily designed, for example using finite element analysis, to have predetermined flexure characteristics adapted to the vibrational characteristics of the drive shaft. Low radial stiffness in the range from 50 to 500 N/mm may be achieved to meet the required rotor dynamics of the pump; lowering the radial stiffness reduces the second mode natural frequency of the pump, which in turn reduces the transmissibility of vibration at full pump speed and hence the level of pump vibration for a specific shaft out-of-balance. In view of this, acceptable levels of transmission imbalance vibration may be achieved without the need to perform high speed balancing, providing a significant cost reduction per pump.

The resilient support is preferably formed from metallic material such as tempered steel, aluminium, titanium, phosphor bronze, beryllium copper, an alloy of aluminium or an alloy of titanium. In this case, the radial and axial stiffnesses of the resilient support do not change with temperature or with time, that is, through creep.

The support is preferably adhered to the outer race using an adhesive.

The present invention also provides a method of assembling a pump insert, the method comprising the steps of locating an annular resilient support about a rolling bearing having an inner race, an outer race and a plurality of rolling elements located between the races, positioning the bearing at a desired location within the support relative to an axial end surface of the support, and at this location, fixing the support to the outer race of the bearing whilst applying a preload to the outer race of the bearing.

As discussed above, at the desired location an axial end surface of the inner race is preferably axially displaced relative to the axial end surface of the resilient support. A spacer may be used to position the bearing at the desired location so that the end surface of the inner race is axially displaced relative to the end surface of the resilient support by a desired amount. For example, the spacer may have a support engaging portion for engaging the end surface of the support, and a bearing engaging portion which protrudes into the bore of the support by the desired amount when the end surface of the support is engaged by the support engaging portion of the spacer. The bearing can be readily positioned within the support so that the end surface of the inner race engages the bearing engaging portion of the spacer, thus enabling the bearing to be accurately positioned at the desired location within the support. A resilient member, for example a spring, can be provided between the spacer and the outer race for applying the axial load to the bearing when it is positioned at the desired location.

The present invention further provides a method of assembling a vacuum pump comprising a body and a rotor supported for rotation relative to the body, the method comprising the steps of sliding an insert as aforementioned over the rotor until an axial end surface of the support engages the body and an axial end surface of the inner race of the bearing engages the rotor, and securing the insert to the rotor.

BRIEF DESCRIPTION OF THE DRAWINGS

Preferred features of the present invention will now be described, by way of example only, with reference to the accompanying drawings, in which.

DETAILED DESCRIPTION

Figure 1:
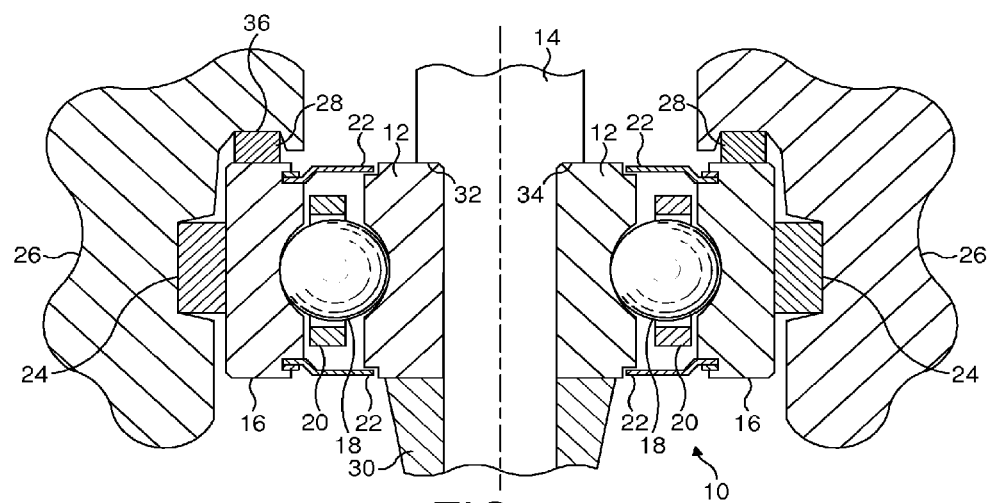
FIG. 1 illustrates a cross-sectional view of a known rolling bearing supporting the rotor of a pump.
Figure 2:
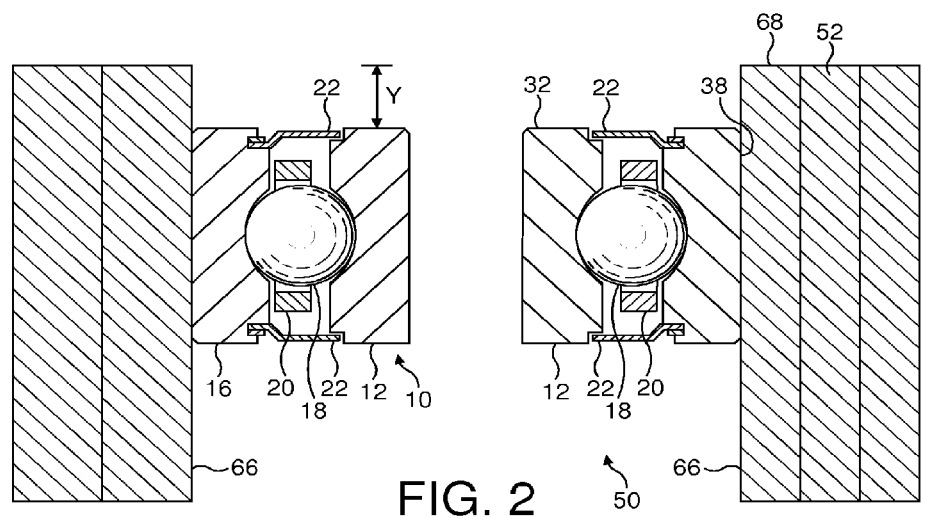
FIG. 2 illustrates a cross-sectional view of a pump insert including a rolling bearing.

FIG. 2 illustrates a cross-sectional view of the pump insert 50, which forms part of a bearing arrangement of a pump. The insert 50 comprises a known rolling bearing 10 as described above with reference to FIG. 1, and which comprises an inner race 12, an outer race 16, and a plurality of rolling elements 18, supported by a cage 20, for allowing relative rotation of the inner race 12 and the outer race 16. The rolling bearing 10 is lubricated to establish a load-carrying film separating the bearing components in rolling and sliding contact in order to minimize friction and wear, and shield elements 22 are provided to resist seepage of lubricant from the rolling bearing 10.

Figure 3:
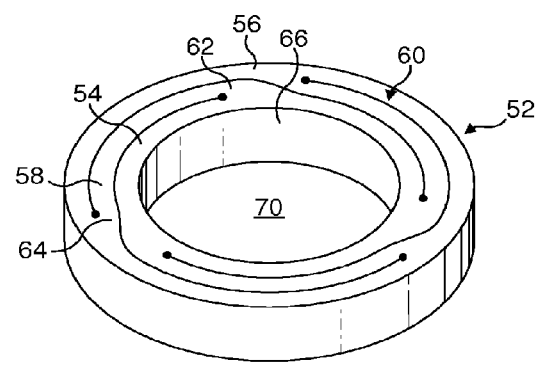
FIG. 3 illustrates a perspective view of the resilient support of the insert of FIG. 2.

The rolling bearing 10 is located within an annular resilient support 52, which is illustrated in more detail in FIG. 3. The resilient support 52 comprises a metallic member having integral inner and outer annular portions 54, 56 connected together by a plurality of integral flexible members 58 formed by machining slots 60 in the support 52. Each flexible member 58 is connected by a first resilient hinge 62 to the inner portion 54, and by a second resilient hinge 64 to the outer portion 56. Each flexible member 58 is in the form of an elongate, arcuate member substantially concentric with the inner and outer annular portions 54, 56, and, as illustrated in FIG. 3, the flexible members 58 are preferably circumferentially aligned. The flexible members 58 of the resilient support 52 thus provide integral leaf springs of the resilient support 52.

Returning to FIG. 2, the outer radial surface 38 of the outer race 16 of the bearing 10 is fixed to the inner, axially extending cylindrical surface 66 of inner portion 54 of the support 52, preferably using an adhesive. The bearing 10 is preferably positioned within the support 52 at a location at which the axial end surface 32 of the inner race 12 of the bearing 10 is axially displaced from the axial end surface 68 by a desired amount y, which is preferably in the range from 1 to 3 mm, and which in a preferred embodiment is 1.8 mm.

Figure 4:
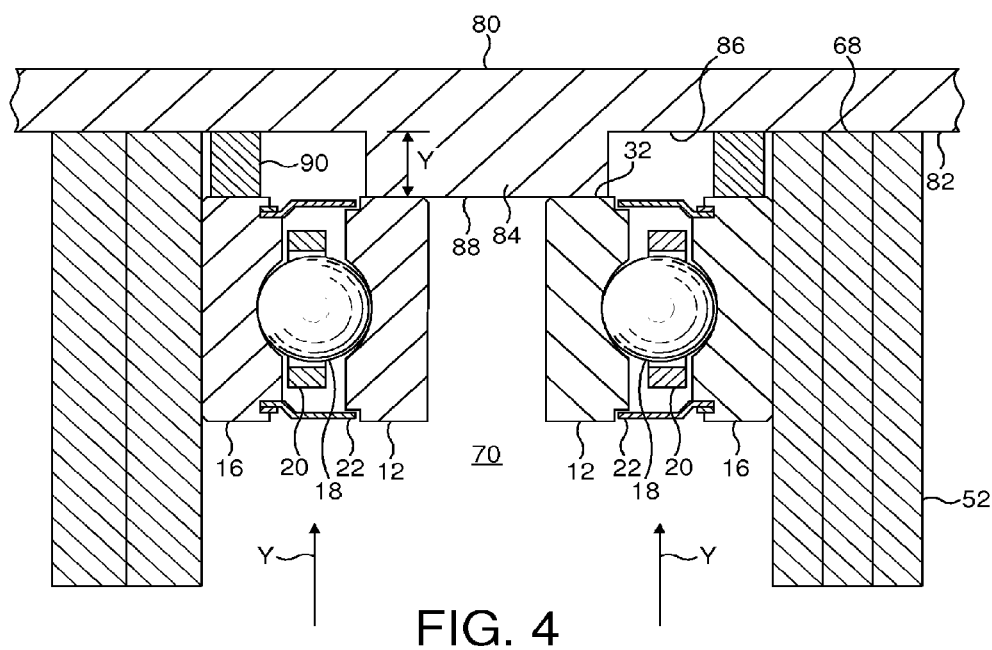
FIG. 4 illustrates a method of assembling the insert of FIG. 2.

FIG. 4 illustrates a method of assembling the insert 50. A spacer 80 is used to position the bearing 10 at the desired location within the support 52. The spacer 80 has a support engaging portion 82 for engaging the axial end surface 68 of the support 52, and a bearing engaging portion 84 for engaging the axial end surface 32 of the inner race 12 of the bearing 10. The support engaging portion 82 has an annular, planar surface 86 which is located on the axial end surface 68 of the support 52 so that the bearing engaging portion 84 of the spacer 80 protrudes into the bore 70 of the support 52 by the desired amount γ. The bearing 10 is inserted into the bore 70 of the support 52, and is pushed towards the spacer 80 until the axial end surface 32 of the inner race 12 engages the axial end surface 88 of the bearing engaging portion 84 of the spacer 80. The bearing 10 is then fixed to the support 52, preferably using an adhesive to adhere the outer radial surface 38 of the outer race 16 of the bearing 10 to the inner cylindrical surface 66 of inner portion 54 of the support 52.

As also illustrated in FIG. 4, a resilient member 90, preferably a tension spring, is located between the spacer 80 and the bearing 10. The resilient member 90 preferably has one end connected to the annular surface 86 of the spacer 80 to retain the resilient member in position. As the bearing 10 is moved towards the spacer 80, the resilient member 90 is compressed between the spacer 80 and the outer race 16 of the bearing 10 to exert an axial load on the outer race 16.

When the bearing 10 is positioned at the desired location, this resilient member 90 applies a known axial load to the outer race 16, so that in the assembled insert 50 the outer race 16 is axially preloaded.

A set of inserts 50 can thus be assembled, sequentially, using the spacer 80 so that, within the set, each rolling bearing 10 is located at the same position relative to its support 52, and each rolling bearing 10 has the same axial preload.

Figure 5:
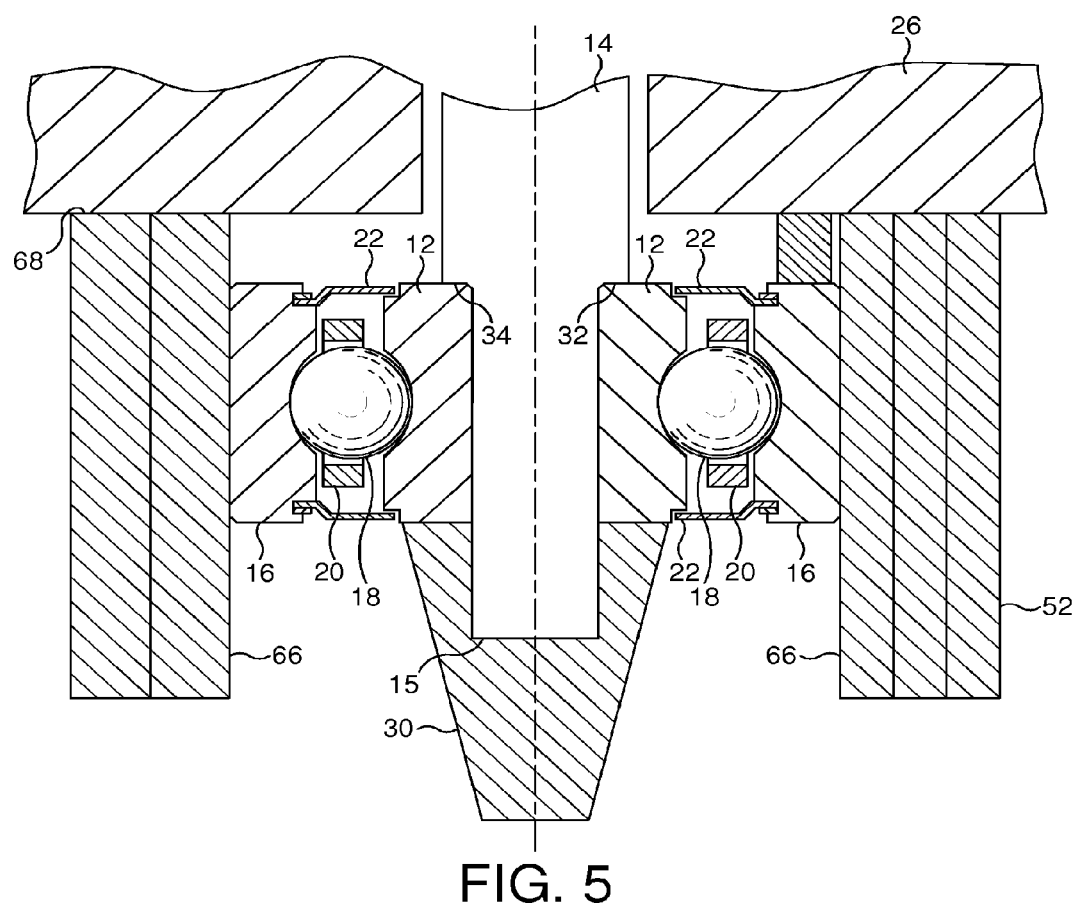
FIG. 5 illustrates a cross-sectional view of the insert of FIG. 2 supporting the rotor of a pump.

FIG. 5 illustrates the insert 50 in situ about the rotor 14 of a vacuum pump. During assembly of the pump, and with the rotor 14 restrained to inhibit its rotation, the insert 50 is located over the end 15 of the rotor 14, and is slid along the rotor 14 until the axial end surface 68 of the support 52 engages the pump body 26 and the axial end surface 32 of the inner race 12 of the bearing 10 engages the abutment surface 34 of the rotor 14. The oil nut 30 is then screwed on to the end of the rotor 14 to secure the inner race 12 of the bearing 10 to the rotor 14. If the pump also has a magnetic bearing forming part of its bearing arrangement for supporting the rotor, the mounting for the magnetic stator rings of the magnetic bearing is adjusted to exert a desired axial preload on the rotor 14.

During servicing of the pump when it is in situ for evacuating a tool, the rotor 14 is again restrained to prevent its rotation, the oil nut is unscrewed from the rotor 14 and the insert 50 is removed from the pump. A fresh insert 50 is then inserted on to the rotor 14 and slid in position, and the oil nut 30 is screwed back on to the rotor to retain the insert 50 in position. As there is a very low tolerance stack-up between the axial end surface 68 of the support 52 and the axial end surface 32 of the inner race 12 of the bearing 10, the axial position of the rotor 14 will hardly change, if at all, as a result of changing the insert 50. Consequently, there is no need to disconnect the pump from the tool to adjust the axial preload on the rotor 14.

The invention claimed is:

1. An insert for insertion around a rotor of a pump, the insert comprising a metallic, annular resilient support comprising inner and outer annular portions connected by a plurality of flexible members, the resilient support extending about a rolling bearing having an inner race, an axially preloaded outer race comprising an outer surface fixedly attached to an inner surface of the inner annular portion of the resilient support by an adhesive, and a plurality of rolling elements located between the races wherein the outer race is positioned on the inner surface at a location determined by an axial load applied to the outer race as the inner race is moved in an opposite direction from the axial load.

2. The insert according to claim 1, wherein an axial end surface of the inner race is axially displaced relative to an axial end surface of the resilient support.

3. The insert according to claim 2, wherein the end surface of the inner race is axially displaced relative to the end surface of the resilient support by a distance in a range from 1 to 3 mm.

4. The insert according to claim 1, wherein each of the flexible members is an elongate, arcuate member substantially concentric with the inner and outer annular portions.

5. The insert according to claim 4, wherein the flexible members are circumferentially aligned.

6. The insert according to claim 1, wherein the flexible members provide a plurality of integral leaf springs of the resilient support.

7. The insert according to claim 1, wherein the metallic material comprises one of tempered steel, aluminium, titanium, phosphor bronze, beryllium copper, an alloy of aluminium and an alloy of titanium.

8. A method of assembling a vacuum pump comprising a body and a rotor supported for rotation relative to the body, the method comprising the steps of sliding an insert according to claim 1 over the rotor until an axial end surface of the support engages the body and an axial end surface of the inner race of the bearing engages the rotor, and securing the insert to the rotor.

9. A vacuum pump comprising a body and a rotor supported for rotation relative to the body by an insert inserted around the rotor, the insert comprising a metallic, annular resilient support comprising inner and outer annular portions connected by a plurality of flexible members, the resilient support extending about a rolling bearing having an inner race, an axially preloaded outer race having an outer surface fixed to an inner surface of the inner annular portion of the resilient support so as to prevent axial movement of the rolling bearing relative to the resilient support, and a plurality of rolling elements located between the races, wherein the outer race is positioned on the inner surface at a location determined by an axial load applied to the outer race as the inner race is moved in an opposite direction from the axial load.

* * * * *